US012646849B1

(12) United States Patent
Markey

(10) Patent No.: US 12,646,849 B1
(45) Date of Patent: Jun. 2, 2026

(54) BROADBAND TAPERED MONOPOLE ANTENNA

(71) Applicant: FIRST RF Corporation, Boulder, CO (US)

(72) Inventor: Michael Robert Markey, Broomfield, CO (US)

(73) Assignee: FIRST RF Corporation, Boulder, CO (US)

( * ) Notice: Subject to any disclaimer, the term of this patent is extended or adjusted under 35 U.S.C. 154(b) by 269 days.

(21) Appl. No.: 18/652,030

(22) Filed: May 1, 2024

(51) Int. Cl.
*H01Q 9/38* (2006.01)
*H01Q 1/48* (2006.01)

(52) U.S. Cl.
CPC ................ *H01Q 9/38* (2013.01); *H01Q 1/48* (2013.01)

(58) Field of Classification Search
CPC .................................. H01Q 9/38; H01Q 1/48
See application file for complete search history.

(56) References Cited

U.S. PATENT DOCUMENTS 8,736,506 B1 * 5/2014 Brock ...................... H01Q 9/38 343/786
12,009,600 B1 * 6/2024 Jensen .................. H01Q 21/26
2022/0037767 A1 * 2/2022 Yun ...................... H01Q 1/2291

* cited by examiner

*Primary Examiner* — Minh Tran
(74) *Attorney, Agent, or Firm* — Cozen O'Connor

(57) ABSTRACT

A broadband tapered monopole antenna includes a counterpoise that is oriented horizontally and a planar radiator that is oriented vertically. The planar radiator is bounded by a curved edge extending between first and second vertices, a first edge adjacent to the curved edge, a second edge adjacent to the first edge, and a third edge adjacent to both the second edge and the curved edge. The first edge extends vertically between the second vertex and a third vertex. The second edge extends horizontally between the third vertex and a fourth vertex. The third edge extends vertically between the fourth vertex and the first vertex. A gap width between the curved edge and the planar counterpoise increases monotonically between a minimum gap width at the first vertex and a maximum gap width at the second vertex. The planar radiator has a maximum height that is greater than the maximum gap width.

22 Claims, 10 Drawing Sheets

BROADBAND TAPERED MONOPOLE ANTENNA

BACKGROUND

A blade antenna is a type of antenna that is shaped like a fairing to reduce drag.

SUMMARY

The present embodiments include a broadband tapered monopole antenna that combines features of monopole antennas and Vivaldi (i.e., tapered slot) antennas. Specifically, at relatively high frequencies the broadband tapered monopole antenna operates in a "Vivaldi" mode that is similar to operation of a conventional Vivaldi antenna in that the broadband tapered monopole antenna radiates unidirectionally as a traveling-wave antenna. At relatively low frequencies the broadband tapered monopole antenna operates in a "monopole" mode that is similar to operation of a conventional monopole antenna in that the broadband tapered monopole antenna radiates omnidirectionally as a resonant antenna.

The broadband tapered monopole antenna advantageously achieves a bandwidth that is greater than that of monopole antennas and Vivaldi antennas by themselves. This extended bandwidth makes the broadband tapered monopole antenna useful for jamming, among other applications. Furthermore, the broadband tapered monopole antenna is shaped to fit into a fairing, making it particularly useful for integration into aircraft, e.g., on top of an airplane fuselage. Furthermore, the broadband tapered monopole antenna may use the fuselage as a counterpoise.

When used on an aircraft, the broadband tapered monopole antenna may be oriented such that the unidirectional radiation in Vivaldi mode is oriented in the forward direction of the aircraft. In this case, the broadband tapered monopole antenna could be used, for example, to jam a radar system located in front of the aircraft (e.g., on another aircraft). Alternatively, the broadband tapered monopole antenna may be oriented such that the unidirectional radiation in Vivaldi mode is oriented in the backward direction of the aircraft. In this case, the broadband tapered monopole antenna could be used to jam a radar system located behind the aircraft. Two of the broadband tapered monopole antenna could mounted on the aircraft in a back-to-back fashion to allow switching between transmission in the forward direction, transmission in the backward direction, or simultaneous transmission in both the forward and backward directions.

In embodiments, a broadband tapered monopole antenna includes a counterpoise that is oriented horizontally and a planar radiator that is adjacent to the counterpoise and oriented vertically. The planar radiator is bounded by a curved edge extending between a first vertex and second vertex, a first edge adjacent to the curved edge and extending vertically between the second vertex and a third vertex, a second edge adjacent to the first edge and extending horizontally between the third vertex and a fourth vertex, and a third edge adjacent to both the second edge and the curved edge. The third edge extends vertically between fourth vertex and the first vertex. A gap width between the curved edge and the planar counterpoise increases monotonically between a minimum gap width at the first vertex and a maximum gap width at the second vertex. The planar radiator has a maximum height that is greater than the maximum gap width.

DETAILED DESCRIPTION

Figure 1:
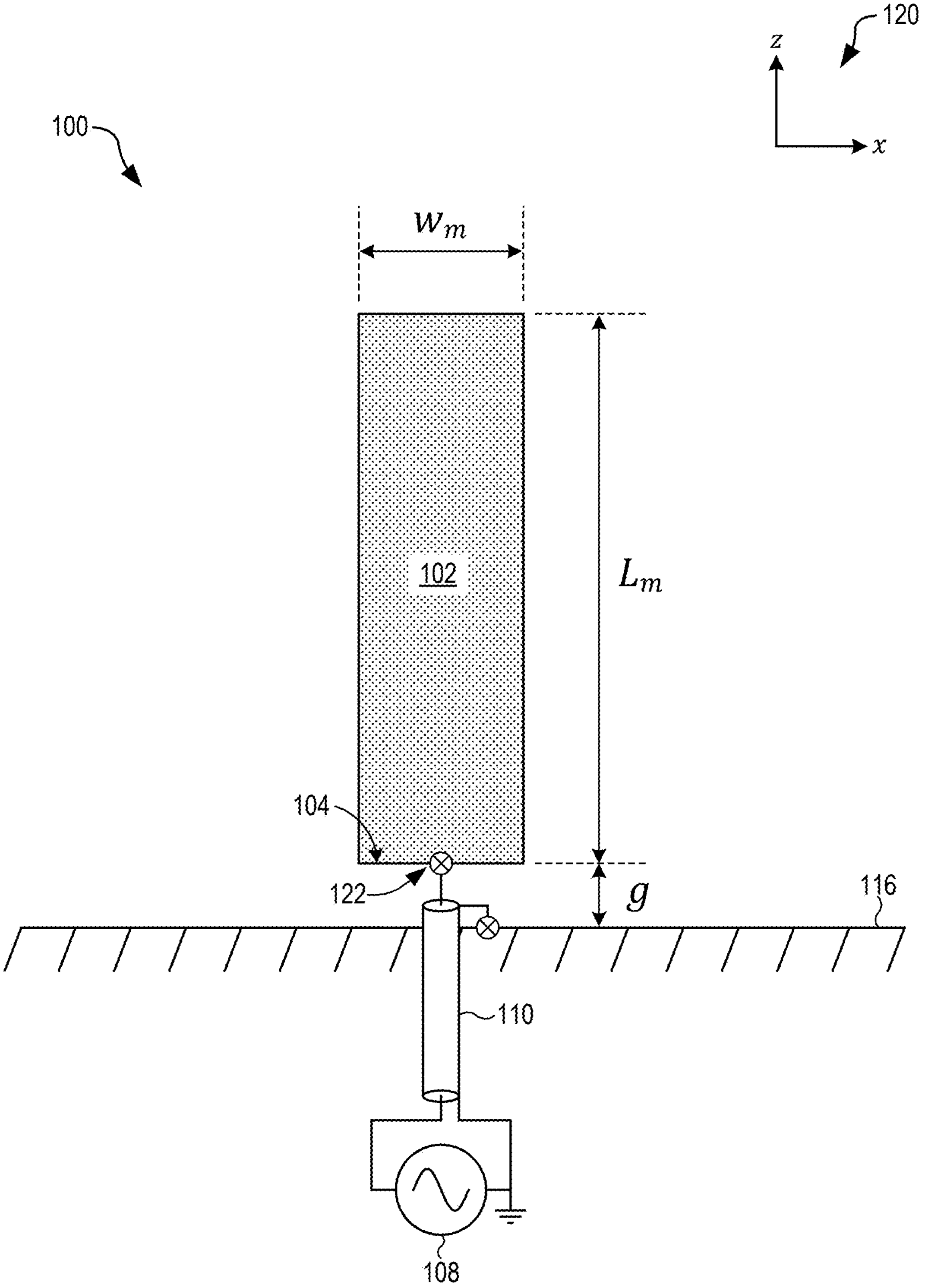
FIG. 1 (PRIOR ART)
FIG. 1 is a side view of a prior-art monopole antenna.

FIG. 1 is a side view of a prior-art monopole antenna 100. The monopole antenna 100 includes a straight conductor 102 (also referred to as a monopole element) that is planar, lying parallel to the x-z plane of a right-handed Cartesian coordinate system 120. The straight conductor 102 extends away (i.e., along the +z direction) from a ground plane 116 that lies parallel to the x-y plane of the coordinate system 120. Thus, only a cross-section of the ground plane 116 is visible in FIG. 1. A bottom edge 104 of the straight conductor 102 extends parallel to the ground plane 116 and lies above the ground plane 116 by a gap distance g to ensure that the straight conductor 102 is not shorted to the ground plane 116. While FIG. 1 shows the straight conductor 102 as a rectangular patch having a length $L_m$ along z and a width $w_m$ along x, the straight conductor 102 may alternatively be a rod-shaped conductor (e.g., a wire), as known in the art.

The monopole antenna 100 is driven by an oscillator 108 (e.g., as part of a transmitter) via a feedline 110. In the example of FIG. 1, the feedline 110 is a transmission line (e.g., a coaxial cable) whose center conductor electrically connects to the straight conductor 102 at a feedpoint 122 that is located on or near the bottom edge 104. The outer conductor of the transmission line (e.g., shielding) electrically connects to the ground plane 116. Typically, although not necessarily, the feedline 110 reaches the bottom edge 104 by extending upward through a hole in the ground plane 116 that is formed underneath the bottom edge 104.

The monopole antenna 100 is a resonant structure that operates over a bandwidth centered at a resonant frequency $f_r$. Resonance occurs when the length $L_m$ equals a resonance length $l_r = n\lambda_r/4$, where n is a positive integer, $\lambda_r = c/f_r$ is the resonant wavelength, and c is the speed of light. When the integer n is odd and the length $L_m$ is slightly less than the resonance length $l_r$, the input reactance of the monopole antenna 100 is 0Ω. In this case, the input impedance of the monopole antenna is purely resistive. For example, when n=1, the monopole antenna 100 operates at its fundamental resonance and achieves a purely resistive input impedance of approximately 35Ω. When the integer n is even, the input impedance of the monopole antenna 100 becomes theoretically infinite. However, due to the finite width $w_m$, the monopole antenna 100 has a finite (resistive) input impedance that is typically a few thousand ohms. For these harmonics, the input impedance is too high for the monopole antenna 100 to radiate significant power.

The monopole antenna 100 has an omnidirectional radiation pattern that is toroidal, i.e., the monopole antenna 100 radiates with equal power in all azimuthal directions (i.e., in the x-y plane) assuming that the width $w_m$ is much less than the length $L_m$. The gain goes to zero as the direction approaches the vertical +z and −z directions. The emitted radiation is polarized along z. For lengths $L_m$ up to λ/2, the radiation pattern has only one lobe that is peaked in the horizontal directions. For lengths $L_m$ greater than λ/2, the radiation pattern forms additional lobes. One common choice of the length $L_m$ is 5λ/8, which maximizes the horizontal gain even though it introduces a smaller second lobe into the radiation pattern.

Figure 2:
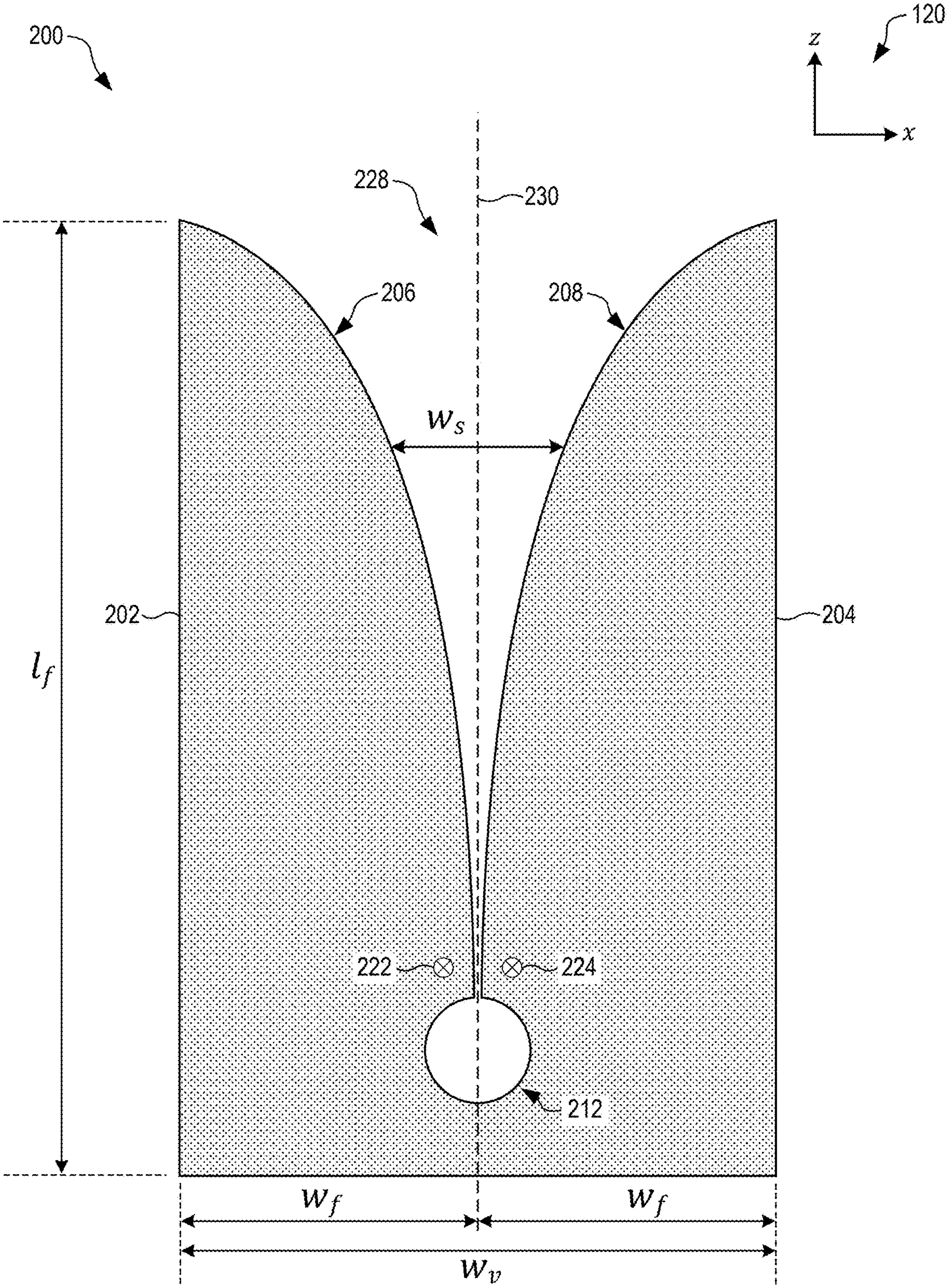
FIG. 2 (PRIOR ART)
FIG. 2 is side view of a prior-art co-planar Vivaldi antenna.

FIG. 2 is side view of a prior art co-planar Vivaldi antenna 200 that has a first fin 202 and a second fin 204. The Vivaldi antenna 200 is "co-planar" in that the fins 202 and 204 lie flat in the same plane that is parallel to the x-z plane. Each of the fins 202 and 204 is an electrically conductive material (e.g., metal) that is bounded by a curved edge. Specifically, the first fin 202 has a first curved edge 206 and the second fin 204 has a second curved edge 208. The fins 202 and 204 exhibit mirror symmetry about a symmetry axis 230 that is parallel to the z axis. The curved edges 206 and 208 therefore serve as the sides of a tapered slot 228 that is devoid of electrically conducting material (but may be filled with a dielectric material). The width $w_s$ of the tapered slot 228 along x increases when moving in the +z direction (i.e., the tapered slot 228 "flares" outward). The curved edges 206 and 208 are typically exponential, but may have other mathematical forms.

The co-planar Vivaldi antenna 200 is fed with a pair of balanced drive signals. Typically, these drive signals are fed to the fins 202 and 204 at respective feed points 222 and 224 that are located on opposite sides of the tapered slot 228. For example, the feed points 222 and 224 may be located near the narrow end of the tapered slot 228 (i.e., where the width $w_s$ is smallest). At this narrow end, the tapered slot 228 behaves like a slotline having a relatively low characteristic impedance (e.g., less than 1000). Moving in the +z direction, the electrical impedance of the tapered slot 228 increases with the width $w_s$.

Since most antennas are driven with an unbalanced signal, a balun is typically used to drive the co-planar Vivaldi antenna 200. For example, a microstrip-to-slotline transition may be used to induce the balanced drive signals at the feed points 222 and 224. The transition includes a microstrip transmission line that perpendicularly crosses the symmetry axis 230, where it is terminated with a short or stub (e.g., a radial stub). In this case, a planar quarter-wave cavity stub 212 may be used to terminate the tapered slot 228. The cavity stub 212 cooperates with the short or stub to provide wideband impedance matching. The cavity stub 212 also provides a high impedance so that the induced drive currents flow upwards into the tapered slot 228. Another method for driving the Vivaldi antenna 200 may be used without departing from the scope hereof. Such methods include, but are not limited to, directly feeding a pair of balanced electrical signals to the feed points 222 and 224 or the curved edges 206 and 208, coaxial feeding with a center conductor that is routed perpendicularly across the tapered slot 228 and terminated in a short or stub, and using a different type of planar-waveguide-to-slotline transition.

In FIG. 2, the cavity stub 212 is co-planar with the fins 202 and 204 and shaped as an electrically non-conductive circle whose center coincides with the symmetry axis 230. The fins 202 and 204 are electrically shorted together beneath (i.e., in the −z direction) the cavity stub 212. This electrical short appears as an inductance in parallel with the tapered slot 228. The cavity stub 212 may have a different shape (e.g., square, rectangle, polygon, etc.). Alternatively, the cavity stub 212 may be replaced with another type of quarter-wave slotline stub. The cavity stub 212 is not necessary and may be excluded without departing from the scope hereof.

The co-planar Vivaldi antenna 200 is an end-fire traveling-wave antenna that, when driven at a frequency f, radiates upward (i.e., in the +z direction) from the region of the tapered slot 228 where $w_s \approx c/2f$. Thus, higher frequencies are emitted near the bottom of the tapered slot 228 (i.e., closer to the cavity stub 212) while lower frequencies are emitted near the top. Because it is a traveling-wave antenna, the Vivaldi antenna 200 features a very high bandwidth that may extend over several octaves. The emitted radiation is linearly polarized along x.

Each of the fins 202 and 204 has a maximum fin length $l_f$ along z and a maximum fin width $w_f$ along x. The width $w_v$ of the co-planar Vivaldi antenna 200 is measured along x direction between the farthest edges of the fins 202 and 204, as shown in FIG. 2. Thus, the co-planar Vivaldi antenna 200 has a width $w_v = 2w_f$. One feature of the co-planar Vivaldi antenna 200 is that it has the same total width $w_v$ throughout its entire length $l_f$.

Figure 3:
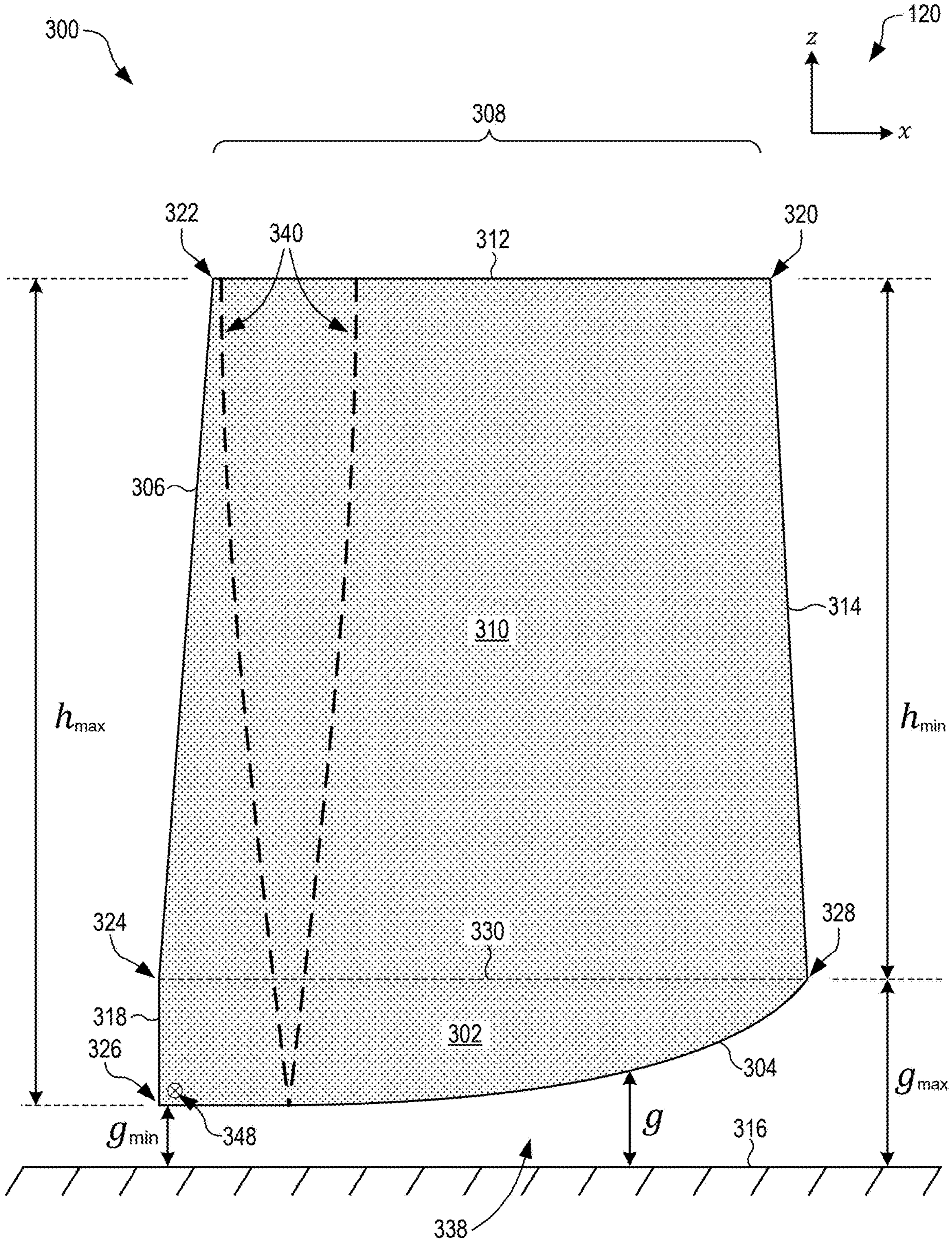
FIG. 3 is a side view of a broadband antenna that combines features of the monopole antenna of FIG. 1 and the co-planar Vivaldi antenna of FIG. 2, in embodiments.

FIG. 3 is a side view of a broadband tapered monopole antenna 300 that combines features of the monopole antenna 100 of FIG. 1 and the co-planar Vivaldi antenna 200 of FIG. 2, in accordance with the present embodiments. At lower frequencies, the antenna 300 operates in a "monopole mode" in which it radiates omnidirectionally like a monopole antenna. At higher frequencies, the antenna 300 operates in a "Vivaldi mode" in which it radiates unidirectionally like a Vivaldi antenna or a similar type of tapered-slot antenna.

The broadband tapered monopole antenna 300 includes a planar radiator 308 that is oriented vertically (i.e., lying parallel to the x-z plane) and a planar counterpoise 316 that is oriented horizontally (i.e., lies parallel to the x-y plane). Only a cross-section of the counterpoise 316 is visible in FIG. 3. The planar radiator 308 is positioned above the counterpoise 316 similarly to how the straight conductor 102 is positioned above ground plane 116 in FIG. 1.

The planar radiator 308 has a Vivaldi sub-radiator 302 and a monopole sub-radiator 310 that are directly connected to each other, both physically and electrically, along an internal edge 330. The sub-radiators 310 and 302 are connected "directly" to each other in that no other radiating element or structure is located between the sub-radiators 302 and 310 in the plane of the planar radiator 308. In addition, the sub-radiators 302 and 310 connect to each other continuously along the entire length of the internal edge 330, and therefore there are no gaps or holes between the sub-radiators 302 and 310. Due to its position relative to the monopole sub-radiator 310, the Vivaldi sub-radiator 302 is also referred to as a "lower radiator section" of the planar radiator 308. Similarly, the monopole sub-radiator 310 is also referred to as an "upper radiator section."

Each of the planar radiator 308, Vivaldi sub-radiator 302, and monopole sub-radiator 310 has a two-dimensional shape, parallel to the x-z plane, whose physical boundary may be described by a set of edges and vertices. A vertex is a point on the physical boundary at which two edges meet. The edges sharing the vertex are described as being "adjacent" to each other. A vertex may form a "kink," i.e., a point at which the mathematical curve defining the boundary is non-differentiable (e.g., see vertices 320 and 322 in FIG. 3). Alternatively, a vertex may join two edges in a continuously smooth (i.e., mathematically differentiable) manner. Each edge is a line joining two vertices. An edge may be straight, curved, or a combination of straight and curved.

The planar radiator 308 is bounded by (i) the curved edge 304, which extends between a first vertex 326 and a second vertex 328, (ii) a first edge 314 that is adjacent to the curved edge 304 and that extends vertically between the second vertex 328 and a third vertex 320, (iii) a second edge 312 that is adjacent to the first edge 314 and that extends horizontally between the third vertex 320 and a fourth vertex 322, and (iv) a third edge 306 that is adjacent to the second edge 312 and that extends vertically between the fourth vertex 322 and a fifth vertex 324, and (v) a fourth edge 318 that is adjacent to the third edge 306 and the curved edge 304 and that extends vertically between the fifth vertex 324 and the first vertex 326. In one embodiment, the fifth vertex 324 is located such that the third edge 306 and fourth edge 318 form a single straight line. In this embodiment, the planar radiator 308 may be thought of as being bounded by only four edges. In other embodiments, the planar radiator 308 forms one or more additional vertices than shown in FIG. 3, in which case the planar radiator 308 is bounded by more than five edges.

The monopole sub-radiator 310 is bounded by the first edge 314, the second edge 312, the third edge 306, and an internal edge 330 that extends between the fifth vertex 324 and the second vertex 328. The Vivaldi sub-radiator 302 is bounded by the curved edge 304, the internal edge 330, and the fourth edge 318.

The edges 304, 306, 312, 314, and 318 are external edges in that they define the overall shape of the planar radiator 308. By contrast, the internal edge 330 does not define the external shape of the planar radiator 308 (although it does define, in part, the shape of the sub-radiators 302 and 310). The internal edge 330 need not be visible in that the sub-radiators 302 and 310 may be constructed as one continuous piece (e.g., a single piece of copper sheet). Alternatively, the sub-radiators 302 and 310 may be constructed as two or more pieces that are subsequently joined together (e.g., by solder or copper tape). In this latter case, the internal edge 330 may be visible (e.g., as a seam, joint, or bead).

The planar radiator 308 may be constructed from an electrically conductive material, such as metal (e.g., copper, nickel, tin, gold, silver, etc.) or high-conductivity silicon. For example, the planar radiator 308 may be copper on a printed circuit board. In this case, the planar radiator 308 is mechanically supported by a dielectric layer of the circuit board. Alternatively, the planar radiator 308 may copper tape applied to a dielectric layer or substrate. Alternatively, the planar radiator 308 may be a free-standing metal sheet or plate. In any case, the planar radiator 308 may be electrically driven similarly to the monopole antenna 100 of FIG. 1, i.e., the center conductor of the feedline 110 connects to a feedpoint 348 while the outer conductor of the feedline 110 connects to the counterpoise 316.

In some embodiments, each external edge (i.e., each of the edges 304, 306, 312, 314, and 318) is continuously bounded by a dielectric (i.e., electrically non-conductive) material along the entirety of its length. In these embodiments, no additional radiating element or structure extends outward from the external edges in the plane of the planar radiator 308.

The Vivaldi sub-radiator 302 is shaped like one of the fins 202 and 204 of the co-planar Vivaldi antenna 200 of FIG. 2, although without the cavity stub 212. The curved edge 304 is similar to the curved edges 206 and 208 of FIG. 2 in that it forms one side of a tapered slot 338 that, like the tapered slot 228 of FIG. 2, is devoid of electrically conducting material. The tapered slot 338 extends between the curved edge 304 and the planar counterpoise 316. Also similar to the tapered slot 228 of FIG. 2, the tapered slot 338 has a gap width g, as measured along z, that increases monotonically along the +x direction between a minimum gap width $g_{min}$ (at the first vertex 326) and a maximum gap width $g_{max}$ (at the second vertex 328). As shown in FIG. 3, the gap width g may strictly increase along the +x direction. Alternatively, the gap width g may non-strictly increase (e.g., in a stepped fashion) along the +x direction.

The monopole sub-radiator 310 may be shaped as a trapezoid, as shown in FIG. 3. In this case, the second edge 312 is straight and parallel to the planar counterpoise 316. Furthermore, the edges 306 and 314 need not lie parallel to the z axis such that the internal edge 330 has a longer length than the second edge 312. Alternatively, one or both of the edges 306 and 314 may be straight and oriented perpendicularly to the planar counterpoise 316. The monopole sub-radiator 310 may be alternatively shaped as a rectangle, square, rhombus, or another type of two-dimensional shape.

The planar radiator 308 has a height h, as measured parallel to the z axis, between the edges 312 and 304. The height h varies along x between a maximum height $h_{max}$ (at which the gap width g is near the minimum gap width $g_{min}$) and a minimum height $h_{min}$ (at which the gap width g is near the maximum gap width $g_{max}$). The height h of the planar radiator 308 establishes a fundamental resonant frequency $$f_0^{(M)}$$

along the vertical direction. Specifically, the fundamental resonant frequency $$f_0^{(M)}$$

is set by the maximum height $h_{max}$ according to the relation $$f_0^{(M)} = c/(4h_{max}).$$

The fundamental resonant frequency $$f_0^{(M)}$$

is indicated in FIG. 3 by a standing-wave pattern 340. The corresponding resonance has a bandwidth that extends between a lowest monopole frequency $$f_L^{(M)}$$

and a highest monopole frequency $$f_H^{(M)}.$$

The superscript "M" indicates that the broadband tapered monopole antenna 300 operates predominantly in monopole mode at frequencies between $$f_L^{(M)} \text{ and } f_H^{(M)}.$$

A lowest tapered-slot frequency $$f_L^{(V)}$$

at which the broadband tapered monopole antenna 300 non-resonantly radiates in Vivaldi mode may be found by setting the maximum gap width $g_{max}$ equal to one-quarter of a wavelength, i.e., $g_{max}=\lambda/4$. Rearranging terms and solving for frequency yields $$f_L^{(V)} = c/(4g_{max}),$$

which can be used to determine the maximum gap width $g_{max}$ for a given value of $$f_L^{(V)}.$$

The frequency $$f_L^{(V)}$$

is labeled with the superscript "V" to indicate that the antenna 300 operates primarily in Vivaldi mode at this frequency. In embodiments, the maximum height $h_{max}$ is greater than the maximum gap width $g_{max}$, for which $$f_L^{(M)} < f_L^{(V)}.$$

In some embodiments, the lowest tapered-slot frequency $$f_L^{(V)}$$

is greater than the fundamental resonant frequency $$f_0^{(M)}.$$

In some of these embodiments, the lowest tapered-slot frequency $$f_L^{(V)}$$

is greater than highest monopole frequency $$f_H^{(M)}.$$

Similarly, a highest tapered-slot frequency $$f_H^{(V)}$$

at which the antenna 300 non-resonantly radiates is given by $$f_H^{(V)} = c/(4g_{min}).$$

To reach frequencies of 6-12 GHz, a typical value of the minimum gap width $g_{min}$ is 0.02 inches. However, the minimum gap width $g_{min}$ may alternatively have a value larger than 0.02 inches or less than 0.02 inches. Thus, the gap widths $g_{min}$ and $g_{max}$ are not drawn to scale in FIG. 3 (and FIG. 4).

The planar radiator 308 cooperates with the planar counterpoise 316 to non-resonantly radiate at frequencies between the lowest tapered-slot frequency $$f_L^{(V)}$$

and the highest tapered-slot frequency $$f_H^{(V)}.$$

In embodiments, the lowest tapered-slot frequency $$f_L^{(V)}$$

is greater than the fundamental resonant frequency.

The width $w_{bb}$ of the broadband tapered monopole antenna 300, as measured along x, is the same as the length of the internal edge 330 (i.e., between the vertices 324 and 328). A typical value of the width $w_{bb}$ is one-half of the wavelength corresponding to the frequency $$f_L^{(V)}.$$

Thus, the ratio of the width $w_{bb}$ to the maximum gap width $g_{max}$ is approximately 2:1. However, this ratio may be greater than 2:1, or less than 2:1, depending on the target impedance and other design and performance factors.

Figure 4:
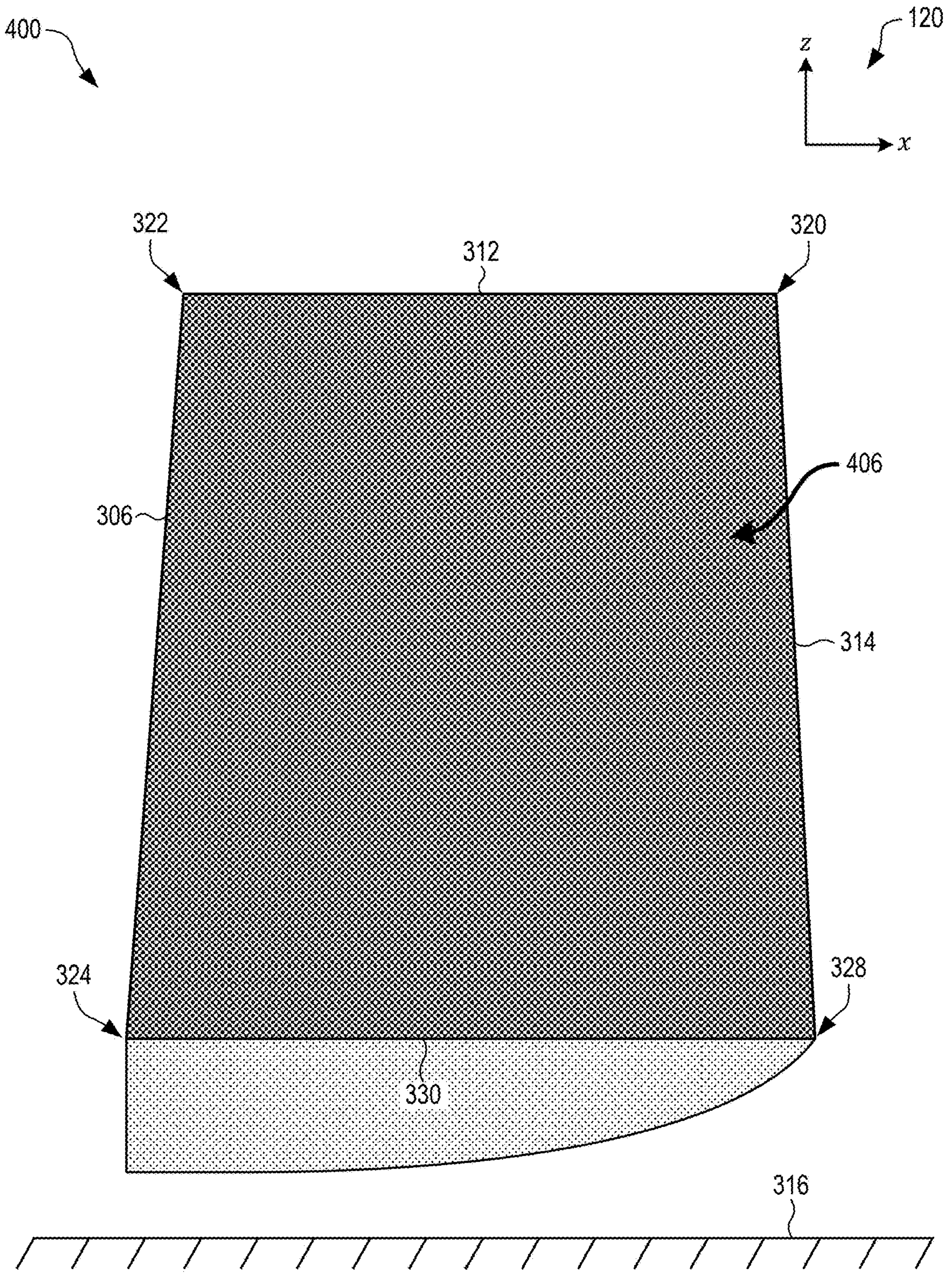
FIG. 4 is a side view of a broadband antenna that is similar to the broadband antenna of FIG. 3 except that it includes a resistive sheet, in embodiments.

FIG. 4 is a side view of a broadband antenna 400 that is similar to the broadband tapered monopole antenna 300 of FIG. 3 except that it includes a resistive sheet 406 placed adjacent to the monopole sub-radiator 310. Thus, in FIG. 4 the monopole sub-radiator 310 is not visible because it is fully covered by the resistive sheet 406. In some embodiments, the resistive sheet 406 only covers the monopole sub-radiator 310, i.e., none of the resistive sheet 406 covers the Vivaldi sub-radiator 302. The resistive sheet 406 may cover the entirety of the monopole sub-radiator 310 or just a portion thereof. While FIG. 4 shows the resistive sheet 406 having the same trapezoidal shape as the monopole sub-radiator 310, the resistive sheet 406 may alternatively extend past one or more of the edges 306, 312, and 314. The resistive sheet 406 is also known as an "R-card." As described in more detail below, the resistive sheet 406 may increase bandwidth by improving impedance matching.

Experimental Demonstration

To demonstrate the broadband antennas 300 and 400, two prototypes were constructed for operation in the range 0.1-10 GHz. The planar radiators of the prototypes were made from copper tape adhered to a dielectric substrate. The planar counterpoise 316 was an aluminum sheet designed to mimic an aircraft fuselage. One prototype contained an R-card (i.e., the resistive sheet 406 of FIG. 4) over the monopolar sub-radiator while the other prototype had no R-card. Each prototype was placed in an anechoic chamber, where it was electrically driven at various frequencies. At each drive frequency, the radiation pattern of the prototype was measured.

Figure 5A:
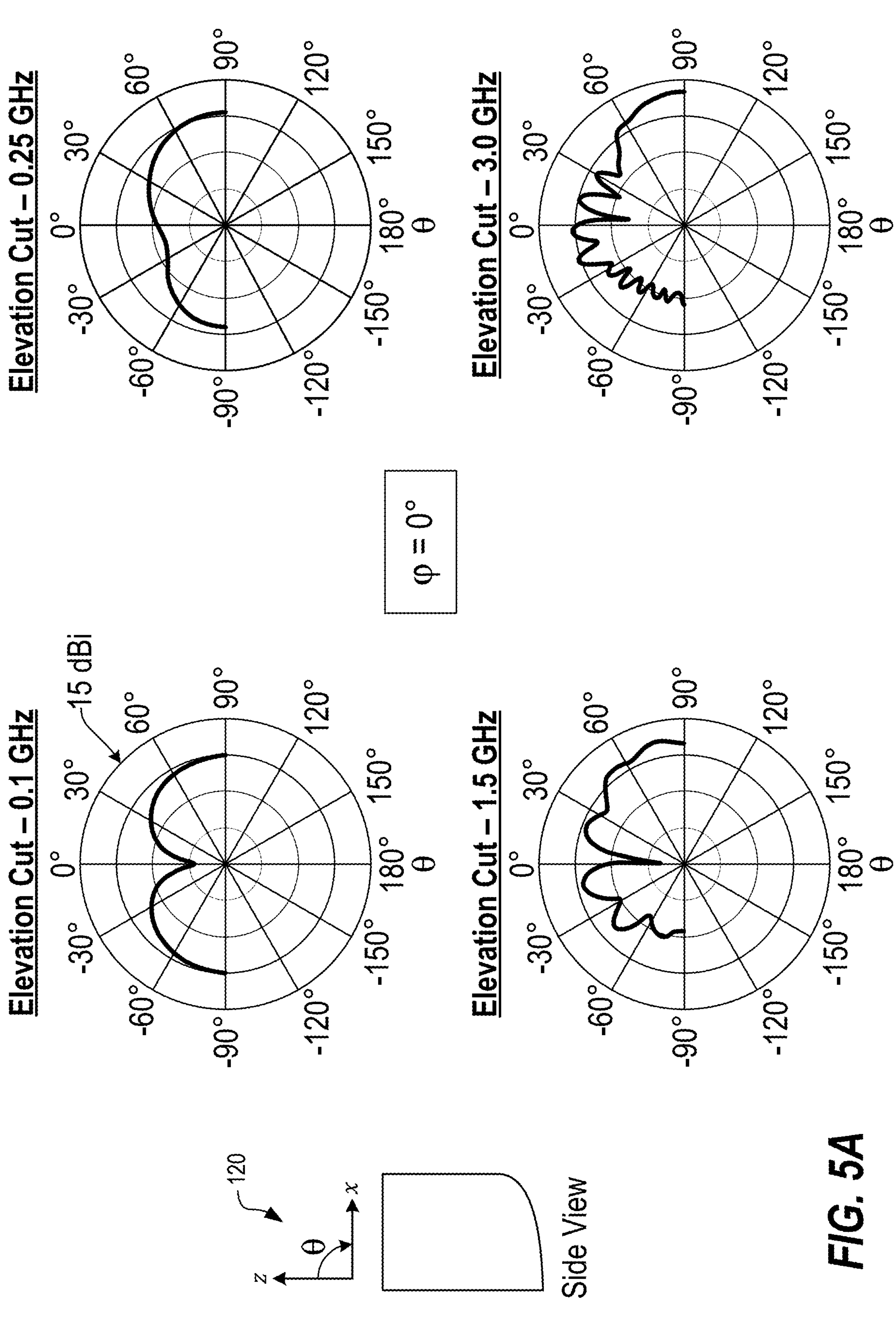
FIG. 5A shows four elevation cuts that were obtained from a numerical model of the broadband antenna of FIG. 3.
Figure 5B:
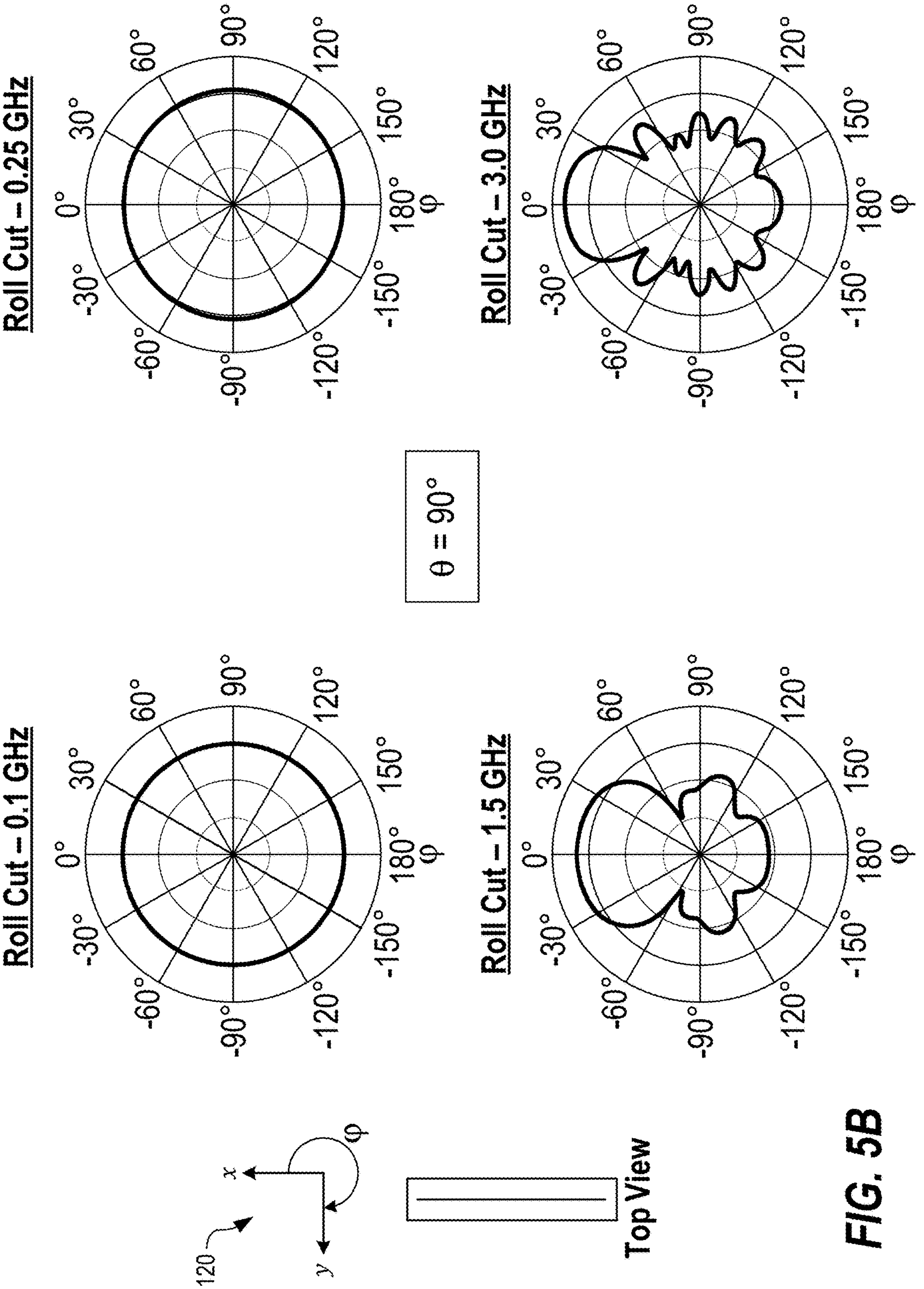
FIG. 5B shows four roll cuts that were obtained from the numerical model of the broadband antenna of FIG. 3.

To obtain predictions for the performance of the prototypes, numerical simulations were performed using electromagnetic modeling software. FIGS. 5A and 5B shows four elevation cuts and four roll cuts, respectively, that were obtained from these models. The elevation angle is denoted $\theta$ with $\theta=0°$ corresponding the vertical upward direction and $\theta=90°$ corresponding to the horizontal forward direction (i.e., the +x direction). The azimuthal angle is denoted $\varphi$ with $\varphi=0°$ corresponding to the horizontal forward direction. Each radial section spans 10 dBi with the outermost "ring" corresponding to +15 dBi. At 0.1 GHZ, the cuts show an omnidirectional radiation pattern, a clear indication of operation in monopole mode. At 3.0 GHz, the cuts are peaked in the forward direction, indicating operation in Vivaldi mode. At 0.25 and 1.5 GHZ, the cuts indicate operation in a combination of monopole and Vivaldi modes.

Figure 6:
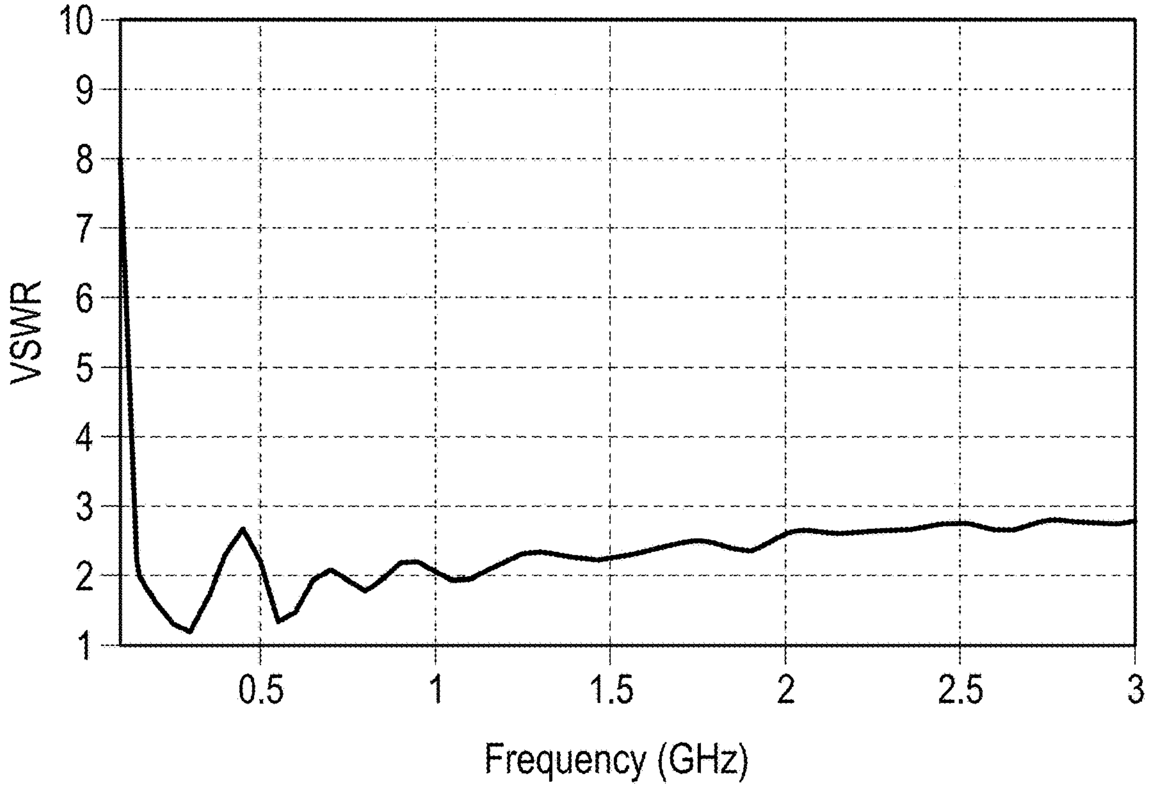
FIG. 6 is a plot of voltage standing-wave ratio (VSWR) as a function of frequency, as obtained from the numerical model.
Figure 7:
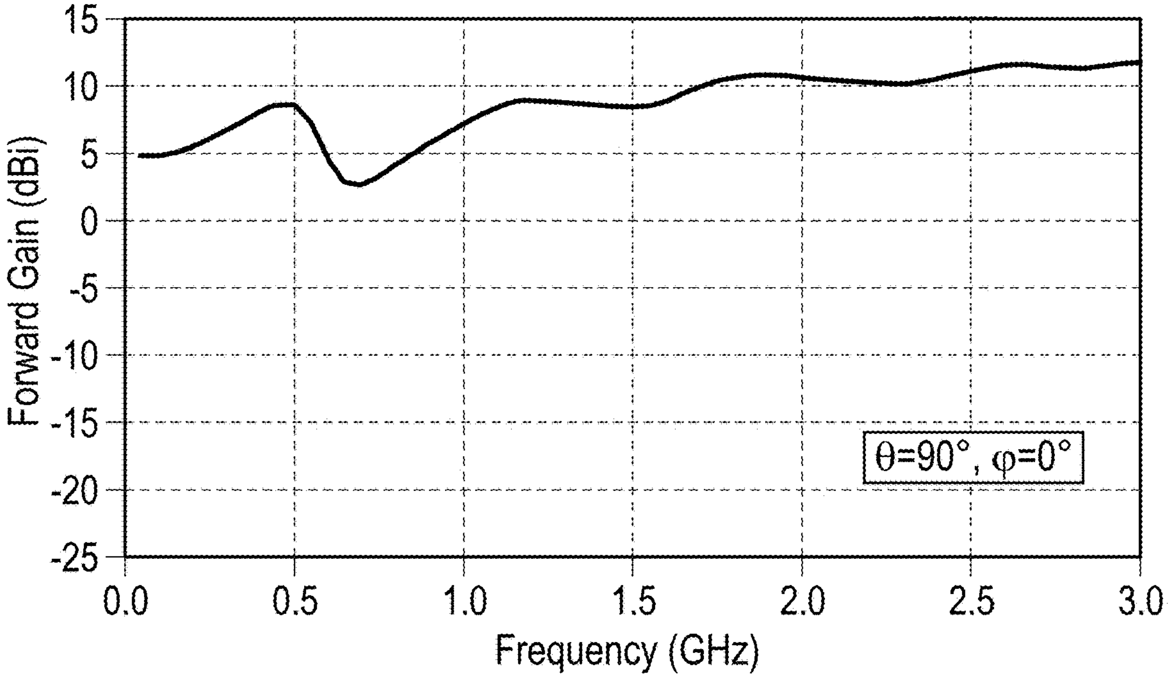
FIG. 7 is a plot of forward gain, as obtained from the numerical model.

FIG. 6 is a plot of voltage standing-wave ratio (VSWR) as a function of frequency, as obtained from the numerical model. The VSWR is less than 3 for all frequencies between 0.1 and 3.0 GHz. FIG. 7 is a plot of forward gain ($\theta=90°$ and $\varphi=0°$), as obtained from the numerical model. With the exception of a small dip between 0.6 and 0.8 GHz, the forward gain is at least 5 dBi for all frequencies between 0.1 and 3.0 GHz.

Figure 8A:
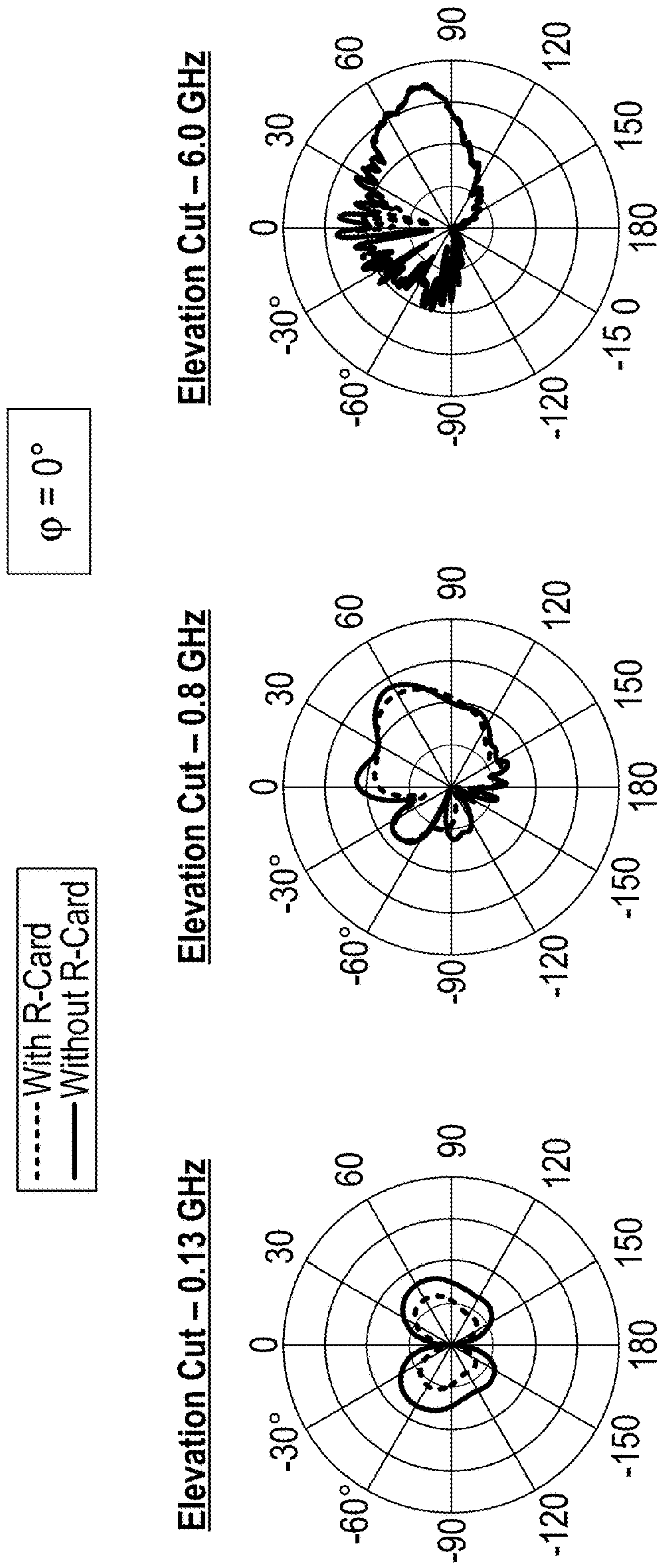
FIG. 8A shows three elevation cuts that were measured with a prototype of the broadband antenna of FIG. 3 and a prototype of the broadband antenna of FIG. 4.
Figure 8B:
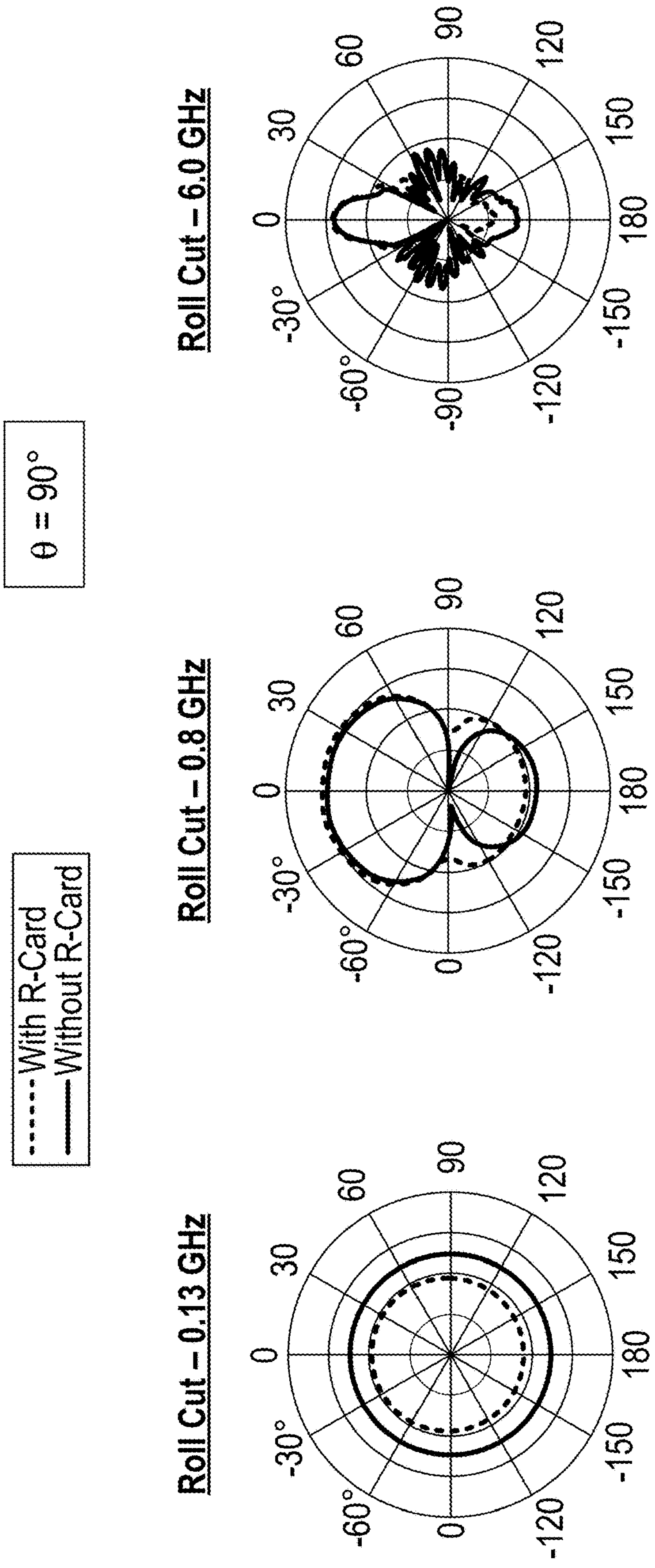
FIG. 8B shows three roll cuts that were measured with the prototype of the broadband antenna of FIG. 3 and the prototype of the broadband antenna of FIG. 4.

FIGS. 8A and 8B show three elevation cuts and three roll cuts, respectively, that were measured with the two prototypes. These cuts show the magnitude of the radiated field. Each radial section spans 10 dB with the outermost ring corresponding to +20 dB. At 0.13 GHz, the cuts show how the resistive losses of the R-card slightly reduces gain, as expected. These cuts also show an omnidirectional radiation pattern, clearly indicating operation in monopole mode. At 6.0 GHz, the cuts show radiation patterns that are forward-peaked, indicating operation in Vivaldi mode. At 0.8 GHz, the radiation pattern exhibits forward peaking and only one null, indicating operation in a combination of monopole and Vivaldi modes.

Figure 9:
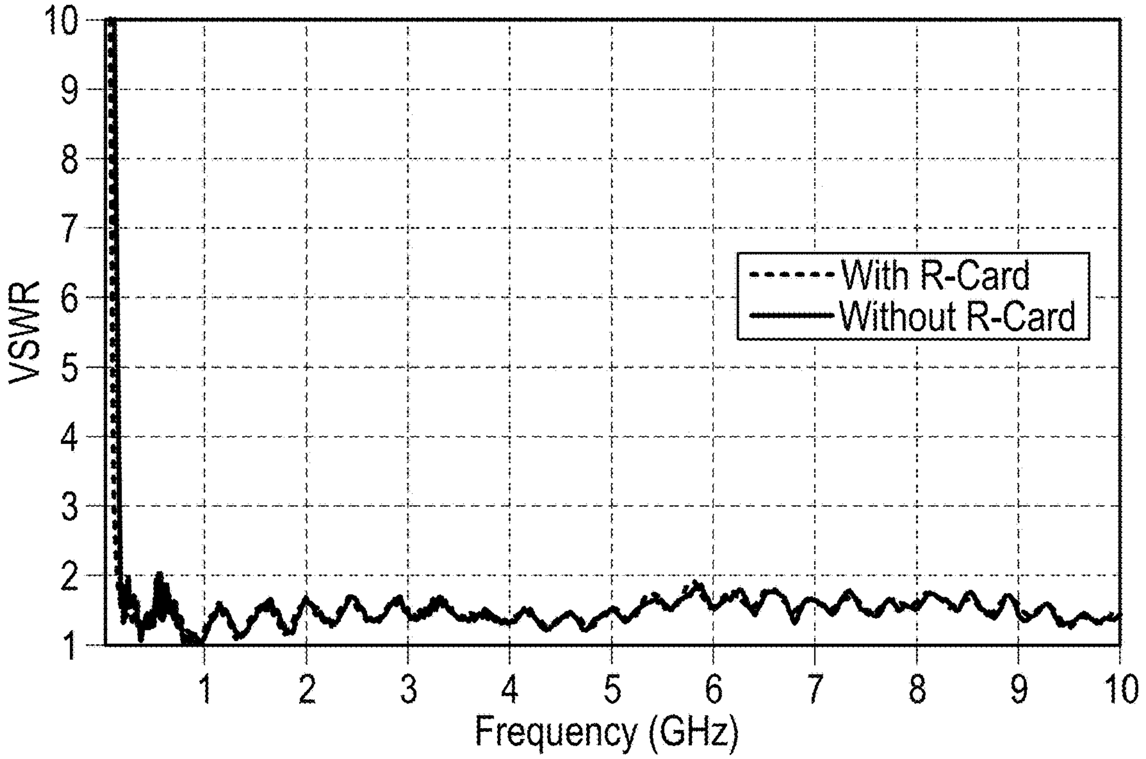
FIG. 9 is a plot of VSWR as a function of frequency, as measured with the prototype of the broadband antenna of FIG. 3 and the prototype of the broadband antenna of FIG. 4.
Figure 10:
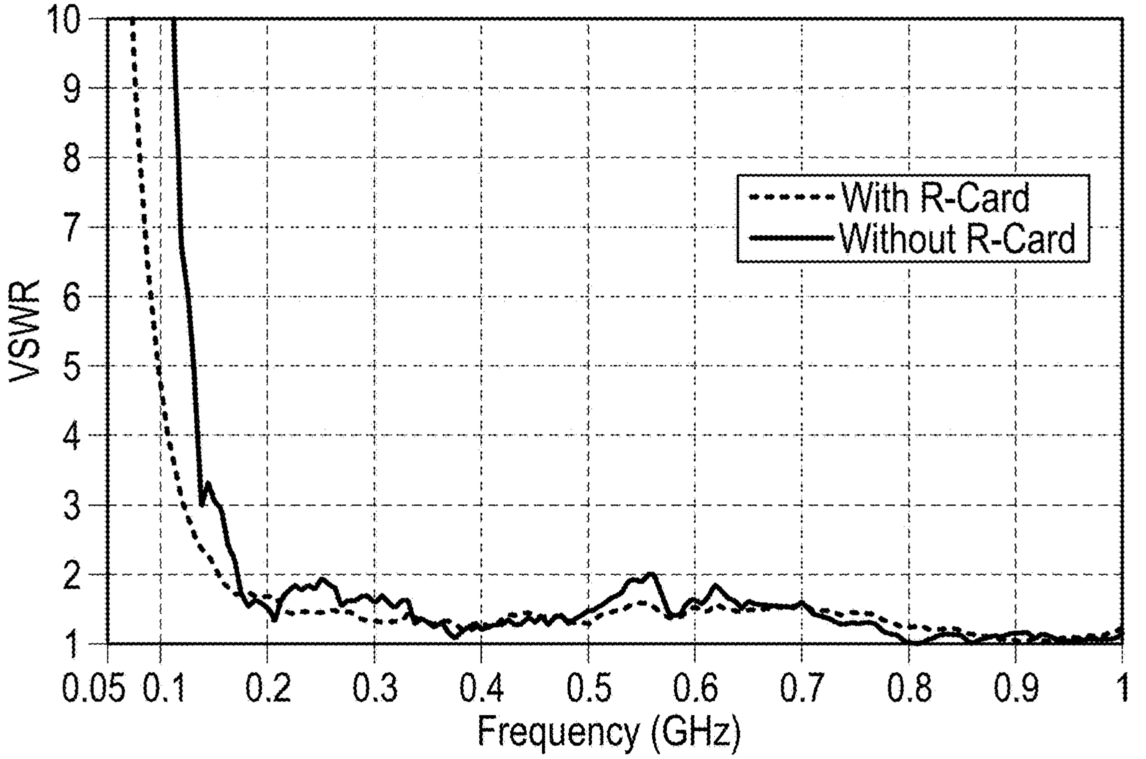
FIG. 10 shows the plot of FIG. 9, but zoomed in to the lower frequencies.

FIG. 9 is a plot of VSWR as a function of frequency, as measured with both of the prototypes. FIG. 10 shows the plot of FIG. 9, but zoomed in to the lower frequencies. Both prototypes had a VSWR of 2 or less for all frequencies between 0.2 and 10 GHz. However, the R-card improved VSWR at lower frequencies, thereby extending low-frequency operation. For example, at 0.125 GHZ, the prototype with the R-card had a VSWR of approximately 2.9 while the prototype without the R-card had a VSWR of approximately 6.1.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A broadband tapered monopole antenna, comprising:

a planar counterpoise; and a planar radiator oriented perpendicularly to the planar counterpoise, the planar radiator being bounded by: a curved edge extending between a first vertex and a second vertex, a gap width between the curved edge and the planar counterpoise increasing monotonically between a minimum gap width at the first vertex and a maximum gap width at the second vertex; a first edge extending at least partially between the second vertex and a third vertex, the third vertex having a perpendicular distance to the planar counterpoise that is greater than the maximum gap width; a second edge extending at least partially between the third vertex and a fourth vertex; a third edge extending at least partially between the fourth vertex and a fifth vertex, the fifth vertex having a perpendicular distance to the planar counterpoise that is greater than the minimum gap width, the fourth vertex having a perpendicular distance to the planar counterpoise that is greater than the perpendicular distance to the planar counterpoise of the fifth vertex; and a fourth edge extending at least partially between the fifth vertex and the first vertex; wherein: the planar radiator has a maximum height that is greater than the maximum gap width, the maximum height establishing a fundamental resonant frequency, the planar radiator cooperating with the planar counterpoise to resonantly radiate at the fundamental resonant frequency; the minimum gap width establishes a highest tapered-slot frequency and the maximum gap width establishes a lowest tapered-slot frequency, the planar radiator cooperating with the planar counterpoise to non-resonantly radiate at frequencies between the highest tapered-slot frequency and the lowest tapered-slot frequency; and the lowest tapered-slot frequency is greater than the fundamental resonant frequency.

2. The broadband tapered monopole antenna of claim 1, wherein:

the planar radiator cooperates with the planar counterpoise to create a resonance that is centered at the fundamental resonant frequency, the resonance extending between a lower monopole frequency and an upper monopole frequency; and the lowest tapered-slot frequency is greater than the upper monopole frequency.

3. The broadband tapered monopole antenna of claim 1, wherein:

the planar radiator lies in a radiator plane; and the planar radiator, along the entirety of the curved, first, second, third, and fourth edges, is bounded by a dielectric material in the radiator plane.

4. The broadband tapered monopole antenna of claim 1, the fifth vertex having a location such that the third edge and the fourth edge form a single straight line.

5. The broadband tapered monopole antenna of claim 1, the perpendicular distance to the planar counterpoise of the fifth vertex being equal to the maximum gap width.

6. The broadband tapered monopole antenna of claim 1, wherein:

the planar radiator comprises an upper radiator section bounded by the first edge, the second edge, the third edge, and an internal edge extending between the fifth vertex and the second vertex; and the broadband tapered monopole antenna further comprises a resistive layer covering at least part of the upper radiator section.

7. The broadband tapered monopole antenna of claim 6, the resistive layer fully covering the upper radiator section.

8. The broadband tapered monopole antenna of claim 6, the resistive layer only covering said at least part of the upper radiator section.

9. The broadband tapered monopole antenna of claim 1, further comprising a dielectric substrate, the planar radiator being located on a face of the substrate.

10. The broadband tapered monopole antenna of claim 1, the planar radiator comprising electrically conductive material.

11. The broadband tapered monopole antenna of claim 10, the electrically conductive material comprising metal.

12. The broadband tapered monopole antenna of claim 11, the metal comprising copper, silver, gold, nickel, tin, or any combination thereof.

13. The broadband tapered monopole antenna of claim 1, the second edge being straight.

14. The broadband tapered monopole antenna of claim 1, wherein: the perpendicular distance to the planar counterpoise of the third vertex is equal to the perpendicular distance to the planar counterpoise of the fourth vertex such that the second edge is parallel to the planar counterpoise.

15. The broadband tapered monopole antenna of claim 1, the first edge being straight.

16. The broadband tapered monopole antenna of claim 15, the first edge being oriented perpendicularly to the planar counterpoise.

17. The broadband tapered monopole antenna of claim 15, the first edge being oriented non-perpendicularly to the planar counterpoise.

18. The broadband tapered monopole antenna of claim 1, the third edge being straight.

19. The broadband tapered monopole antenna of claim 18, the third edge being oriented perpendicularly to the planar counterpoise.

20. The broadband tapered monopole antenna of claim 18, the third edge being oriented non-perpendicularly to the planar counterpoise.

21. The broadband tapered monopole antenna of claim 1, the first and second edges form, at the third vertex, an inside angle of the planar radiator that is greater than ninety degrees.

22. The broadband tapered monopole antenna of claim 1, the second and third edges form, at the fourth vertex, an inside angle of the planar radiator that is greater than ninety degrees.

* * * * *